UNITED STATES PATENT OFFICE.

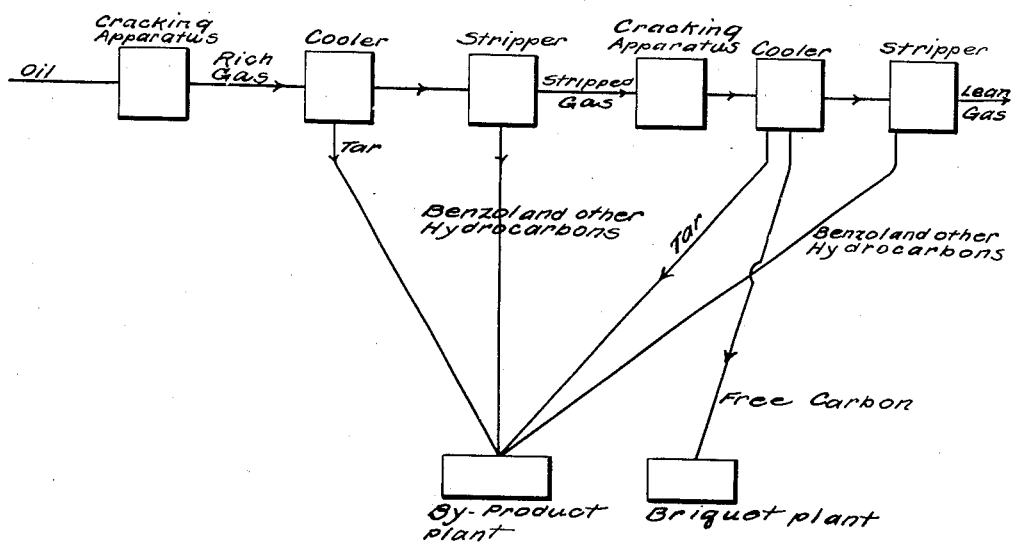

ELMON LAWRENCE HALL, OF PORTLAND, OREGON, ASSIGNOR OF ONE-HALF TO HILMAR PAPST, OF PORTLAND, OREGON.

GAS MAKING.

1,409,709. Specification of Letters Patent. Patented Mar. 14, 1922.

Application filed June 8, 1920. Serial No. 387,393.

*To all whom it may concern:*

Be it known that I, ELMON LAWRENCE HALL, a citizen of the United States, residing at Portland, in the county of Multnomah and State of Oregon, have invented certain new and useful Improvements in Gas Making, of which the following is a specification.

This invention relates to gas making; and it comprises a method of methodically converting petroleum oil into gas with the production of large quantities of hydrogen-rich gas and the conversion of the carbon content into marketable forms, wherein heavy oil is gasefied in such manner as to convert a large proportion of the carbon thereof into tarry products of the nature of coal tar, the resulting gas is stripped to recover valuable bodies not taken up by the tar, is reheated to a high temperature to remove a further proportion of carbon and is then stripped to produce a lean gas of about 500 to 600 B. T. U. per cubic foot; all as more fully hereinafter set forth and as claimed.

As is well known, heavy petroleum oils are broken up by high heat to form various products; the character of these products depending upon the time and temperature. If the heat is high enough and the time of exposure thereto sufficiently long, all of the hydrocarbons of the oil can be broken up, giving free carbon as a solid residue and free hydrogen as a gas. For example, a relatively short exposure of the hydrocarbons of oil to a temperature of 1000° C. (1832° F.) results in depositing nearly all the carbon of the hydrocarbons in the solid form as coke or lampblack (according to the circumstances of heating), while all the hydrogen appears in the free form. The composition of the gas produced from almost any oil at this temperature is about 93 to 96 per cent $H_2$ and 7 to 4 per cent $CH_4$. In other words, practically all the carbon is deposited as such. Gas is made in this manner; the carbon separated being marketable as fuel, pigment, etc. In the present invention I do not strive to obtain so drastic and fargoing a breaking down of the oil as to release all of the carbon. It is my object, by a methodical succession of steps, to break down the oil so as to recover the carbon in combination with a small amount of hydrogen; making products of the nature of those found in coal tar. That is, in lieu of striving to obtain all the hydrogen as such, I allow some of it to remain with the carbon. It is my object to crack down the oil in such a manner as to give a maximum yield of bodies of the nature of those obtained in coal tar, and a final gas, chiefly hydrogen and methane, which will run around 500 to 600 B. T. U. per cubic foot; or of such B. T. U. contents as may be advantageous.

As is well known, the effect of heating oil and its vapors to about 650° to 750° C. is to break it down into gases in which the carbon to hydrogen ratio is not very different from that in the original oil, although the hydrogen content is usually somewhat greater. If the heating is carried further, the gas in turn breaks up, giving tarry products of the nature of coal tar, benzol, naphthalene, etc. Coal tar, benzol, naphthalene, etc., contain considerably more carbon in proportion to the hydrogen than do the petroleum oils. This fact is utilized in the present invention.

In the present invention any suitable heavy mineral oil is first gasified at about a red heat, using any suitable apparatus, such as externally heated retorts, checkers, etc. The heating, however, is carried to such a point that tarry products are obtained. Usually, this requires a finishing temperature of 850° to 900° C. The particular temperature necessary, however, varies with the time of exposure thereto; it being possible to use temperatures above 900° C. with a rapid feed of vapors and gases through the heating zone. The object in this stage of the operation is to first break down the oil into gases of the paraffin and olefin series; and then further break down these gases by dehydrogenation into aromatic bodies (coal tar constituents). On cooling the cracked gas, it deposits large volumes of tar of a constitution analogous to coal tar and susceptible of treatment in the same manner. Some of the benzol, napthalene, etc., will escape condensation with the tar and I therefore next strip the gas in any suitable manner to recover these vapors. Scrubbing with oil or compression and chilling may be used; or both together. Whatever the method of stripping employed, it is my object to recover as much of the condensable matter as possible. The gas after scrubbing still contains more carbon than I desire in my final gas. I therefore repeat the cracking operation, exposing the gas to a high temperature in any suitable heating device, such as a checker or an externally heated retort. Prior to this reheating, the gas may be scrubbed and purified in any usual way. These oils frequently contain much sulphur and it is desirable to remove this sulphur, which may be done in the usual ways. In the further cracking, a certain amount of tar, benzol, or free carbon etc., is produced and this is removed by condensation and scrubbing as before.

In the accompanying flow sheet I have shown diagrammatically the operation as above outlined.

As will be noted, oil, which may be any heavy mineral oil, goes through a cracking apparatus and is converted into tar carrying gas. This cracker may be internally or externally fired; that is, it may consist of a retort apparatus externally heated or it may take the form of a checkerwork which is alternately heated by combustion therein and is used for pyrolyzing the oil. In so using a checker, there may be enough carbon deposited in the cracking to serve as fuel in the next operation. The checker may be heated by combustion elsewhere. The tar carrying gas, after leaving the cracking apparatus is sent through the usual condensing arrangements to condense and recover tar. Afterward, it is stripped of benzol, naphthalene and other volatiles by compression and chilling or by scrubbing with oil, or by both. The stripped or dry gas is now reheated in the same types of apparatus as previously used. This results in a further formation of tar and condensable hydrocarbons which are collected and removed as before; or alternatively by carrying still higher temperatures considerable quantities of free carbon may be obtained and subsequently recovered in the usual scrubbing apparatus, resulting, however, in a lesser production of tar, light oils and other hydrocarbons. The lean gas formed in this second heating is used for any suitable purpose. It will be found to run between 500 and 600 B. T. U., according to the conditions of operation. The more methane is left in it in the final cracking, the higher will be the B. T. U. value. It is easy to control conditions to give it any desired B. T. U. value. The gas coming from the first cracking operation may go as high as 1200 B. T. U.

In the various operations pressure greater or less than atmospheric may be used, but working at the ordinary pressure or merely enough above the same to allow movement of gases does sufficiently well. While some proportion of steam may be used with the gas, its presence is not particularly advantageous to the present purposes.

What I claim is:—

1. The process of converting oil into a lean gas and marketable by-products which comprises cracking said oil at a temperature yielding tar of the nature of coal tar, collecting and removing tar and condensable hydrocarbons to produce a dry gas, reheating this dry gas to produce further cracking therein with formation of tar and condensable bodies or free carbon or both and collecting and removing the tar, condensable bodies and free carbon.

2. The process of obtaining lean gas together with tar, benzol and free carbon as by-products which comprises passing mineral oil through a suitably heated zone at a temperature high enough to produce gas and form tar of the nature of coal tar, benzol and free carbon by secondary action in said gas, removing the tar, stripping the gas of benzol and the like, reheating the gas in a similar way and once more removing produced tar, condensable hydrocarbons or free carbon.

In testimony whereof, I affix my signature.

ELMON LAWRENCE HALL.